United States Patent
Zou

(10) Patent No.: US 9,288,662 B2
(45) Date of Patent: Mar. 15, 2016

(54) METHOD, APPARATUS, AND MEDIA GATEWAY FOR CODEC RATE ADJUSTMENT

(71) Applicant: Huawei Technologies Co., Ltd., Shenzhen (CN)

(72) Inventor: Chao Zou, Xi'an (CN)

(73) Assignee: Huawei Technologies Co., Ltd., Shenzhen (CN)

(*) Notice: Subject to any disclaimer, the term of this patent is extended or adjusted under 35 U.S.C. 154(b) by 79 days.

(21) Appl. No.: 14/094,895

(22) Filed: Dec. 3, 2013

(65) Prior Publication Data

US 2014/0106729 A1 Apr. 17, 2014

Related U.S. Application Data

(63) Continuation of application No. PCT/CN2011/075333, filed on Jun. 3, 2011.

(51) Int. Cl.
*H04W 8/22* (2009.01)
*G10L 19/24* (2013.01)
*H04L 29/06* (2006.01)

(52) U.S. Cl.
CPC ............. *H04W 8/22* (2013.01); *G10L 19/24* (2013.01); *H04L 65/103* (2013.01); *H04L 65/1043* (2013.01); *H04L 65/80* (2013.01); *H04L 69/24* (2013.01)

(58) Field of Classification Search
CPC ... H04W 88/18; H04W 88/181; H04W 88/00; H04W 88/02; H04W 88/16; H04W 92/00; H04W 92/02; H04W 92/04; H04W 92/06; H04W 92/10; H04W 92/08; H04W 92/12; H04W 28/22; H04W 8/22; H04W 8/24; H04L 65/103; H04L 69/24; H04L 65/1043; H04L 65/1069; H04L 65/80; H04L 1/0002; G10L 19/24; H04M 7/0072
USPC ............. 455/403, 418–420, 439, 445, 500, 455/557–558, 560–561; 370/328, 338, 370/400–402, 463–465, 467–469, 545
See application file for complete search history.

(56) References Cited

U.S. PATENT DOCUMENTS 6,751,477 B1 * 6/2004 Alperovich et al. .......... 455/560
2004/0203448 A1 * 10/2004 Nagata ...................... 455/67.11
(Continued)

FOREIGN PATENT DOCUMENTS

CN 1545234 A 11/2004
CN 101212459 A 7/2008
(Continued)

OTHER PUBLICATIONS

Daniel, L., et al., "Proposed text for section 4.1 of TR 23.977 (BARS)," 3GPP TSG-SA2 Meeting #35, S2-033740, Oct. 27-31, 2003, 7 pages.
(Continued)

*Primary Examiner* — Meless Zewdu
(74) *Attorney, Agent, or Firm* — Conley Rose, P.C.; Grant Rodolph

(57) ABSTRACT

The present invention discloses a method for codec rate adjustment. A media gateway (MGW) determines whether an initial codec rate of a first interface is consistent with an initial codec rate of a second interface or an initial codec rate of a third interface, where the first interface is an A interface, the second interface is an Nb interface, and the third interface is an Iu interface; when determining that the initial codec rate of the first interface is inconsistent with the initial codec rate of the second interface or the initial codec rate of the third interface, the MGW adjusts the initial codec rate of the second interface or the initial codec rate of the third interface to the initial codec rate of the first interface. Therefore, quick and convenient codec rate adjustment can be implemented and voice service quality can be improved.

18 Claims, 7 Drawing Sheets

(56) References Cited

U.S. PATENT DOCUMENTS

| | | | |
|---|---|---|---|
| 2007/0165636 A1* | 7/2007 | He et al. .................. | 370/391 |
| 2008/0133247 A1* | 6/2008 | Kurittu ..................... | 704/500 |
| 2008/0212575 A1* | 9/2008 | Westberg .................. | 370/356 |
| 2008/0299963 A1* | 12/2008 | Balachandran et al. ... | 455/422.1 |
| 2009/0076802 A1* | 3/2009 | Witzel et al. ............... | 704/201 |
| 2010/0097990 A1* | 4/2010 | Hallenstal et al. ........ | 370/328 |
| 2010/0274905 A1* | 10/2010 | Pantaleo et al. ........... | 709/227 |
| 2011/0019638 A1* | 1/2011 | Hamel et al. .............. | 370/331 |
| 2011/0138071 A1 | 6/2011 | Lin | |
| 2011/0170410 A1* | 7/2011 | Zhao et al. ................ | 370/232 |
| 2012/0028642 A1* | 2/2012 | Schliwa-Bertling ....... | 455/436 |

FOREIGN PATENT DOCUMENTS

| | | |
|---|---|---|
| CN | 101282284 A | 10/2008 |
| CN | 101651607 A | 2/2010 |
| WO | 2007084417 A2 | 7/2007 |
| WO | 2008086824 A1 | 7/2008 |

OTHER PUBLICATIONS

Foreign Communication From a Counterpart Application, European Application No. 11795147.5, Extended European Search Report dated Aug. 12, 2014, 11 pages.

Foreign Communication From a Counterpart Application, PCT Application No. PCT/CN2011/075333, English Translation of Chinese Search Report dated Mar. 15, 2012, 4 pages.

Foreign Communication From a Counterpart Application, PCT Application No. PCT/CN2011/075333, English Translation of Chinese Written Opinion dated Mar. 15, 2012, 4 pages.

Foreign Communication From a Counterpart Application, Chinese Application No. 201180000833.2, Chinese Office Action dated Oct. 12, 2012, 6 pages.

"3rd Generation Partnership Project; Technical Specification Group Core Network and Terminals; Core Network Nb Interface User Plane Protocols (Release 8)," 3GPP TS 29.415, V8.0.0, May 2008, 14 pages.

"3rd Generation Partnership Project; Technical Specification Group Services and System Aspects; Mandatory Speech Codec; Adaptive Multi-Rate (AMR) Speech Codec; Interface to Iu, Uu and Nb (Release 10)," 3GPP TS 26.102, V10.0.0, Mar. 2011, 29 pages.

"3rd Generation Partnership Project; Technical Specification Group Core Network and Terminals; Out of Band Transcoder Control; Stage 2 (Release 11)," 3GPP TS 23.153, V11.1.0, Jun. 2012, 103 pages.

3rd Generation Partnership Project; Technical Specification Group Radio Access Networ; UTRAN Iu Interface User Plan Protocols (Release 11), 3GPP TS 25.415, V11.0.0, Sep. 2012, 63 pages.

* cited by examiner

METHOD, APPARATUS, AND MEDIA GATEWAY FOR CODEC RATE ADJUSTMENT

CROSS-REFERENCE TO RELATED APPLICATIONS

This application is a continuation of International Application No. PCT/CN2011/075333, filed on Jun. 3, 2011, which is hereby incorporated by reference in its entirety.

TECHNICAL FIELD

The present invention relates to the field of communications technologies, and in particular, to a method, an apparatus, and a media gateway for codec rate adjustment.

BACKGROUND

At present, the 3rd Generation Partnership Project (3GPP) protocol describes only a policy of selecting an initial codec rate of each interface for Adaptive Multi-Rate codec (AMR)/Adaptive Multi-Rate Wideband codec (AMR-WB).

For example, a policy of selecting an initial codec rate of an A interface for AMR/AMR-WB is as follows: a low codec rate is selected preferentially to obtain the current channel quality. If the channel quality is confirmed to be good, the codec rate is gradually increased to improve the voice service quality. A policy of selecting an initial codec rate of an Iu interface or an Nb interface for AMR/AMR-WB is as follows: a high codec rate is selected preferentially.

In the scenario of Transcoder Free Operation (TrFO) communication, because selection of the initial codec rate of each interface for AMR/ARM-WB exists collision, for example, if the channel quality is poor, using a high codec rate by the downstream increases the probability of packet loss and packet error, which greatly affects the voice service quality; in addition, the process of initiating a request for reducing a codec rate after poor voice service quality is detected is slow, resulting in non-timely codec rate adjustment.

SUMMARY

Embodiments of the present invention provide a method, an apparatus, and a media gateway for codec rate adjustment to implement quick and convenient codec rate adjustment.

In one aspect, an embodiment of the present invention provides a method for codec rate adjustment, including: determining, by a media gateway (MGW), whether an initial codec rate of a first interface is consistent with an initial codec rate of a second interface or an initial codec rate of a third interface, where the first interface is an A interface between a base station subsystem (BSS) and the MGW, the second interface is an Nb interface between the MGW and a peer MGW, and the third interface is an Iu interface between a radio network subsystem (RNS) and the MGW; when the initial codec rate of the first interface is inconsistent with the initial codec rate of the second interface or the initial codec rate of the third interface, adjusting, by the MGW, the initial codec rate of the second interface or the initial codec rate of the third interface to the initial codec rate of the first interface.

In another aspect, an embodiment of the present invention provides an apparatus for codec rate adjustment, including: a determining unit configured to determine whether an initial codec rate of a first interface is consistent with an initial codec rate of a second interface or an initial codec rate of a third interface, where the first interface is an A interface between a BSS and a MGW, the second interface is an Nb interface between the MGW and a peer MGW, and the third interface is an Iu interface between a RNS and the MGW; an adjusting unit configured to adjust the initial codec rate of the second interface or the initial codec rate of the third interface to the initial codec rate of the first interface when the determining unit determines that the initial codec rate of the first interface is inconsistent with the initial codec rate of the second interface or the initial codec rate of the third interface.

In still another aspect, an embodiment of the present invention provides a media gateway, which includes the foregoing apparatus for codec rate adjustment.

In the technical solutions provided by the present invention, when determining that the initial codec rate of the Iu interface or the Nb interface is inconsistent with the initial codec rate of the A interface, the MGW adjusts the initial codec rate of the Iu interface or the Nb interface to the initial codec rate of the A interface, therefore implementing quick and convenient codec rate adjustment, improving voice service quality, and avoiding non-timely codec rate adjustment resulting from a slow process of initiating a request for reducing a codec rate after poor voice service quality is detected.

BRIEF DESCRIPTION OF DRAWINGS

To describe the technical solutions in the embodiments of the present invention more clearly, the following briefly introduces the accompanying drawings required for describing the embodiments. The accompanying drawings in the following descriptions show merely some embodiments of the present invention, and persons of ordinary skill in the art may still derive other drawings from the accompanying drawings without creative efforts.

DESCRIPTION OF EMBODIMENTS

The following clearly and completely describes the technical solutions in the embodiments of the present invention with reference to the accompanying drawings in the embodiments of the present invention. The described embodiments are merely a part rather than all of the embodiments of the present invention. All other embodiments obtained by persons of ordinary skill in the art based on the embodiments of the present invention without creative efforts shall fall within the protection scope of the present invention.

Figure 1:
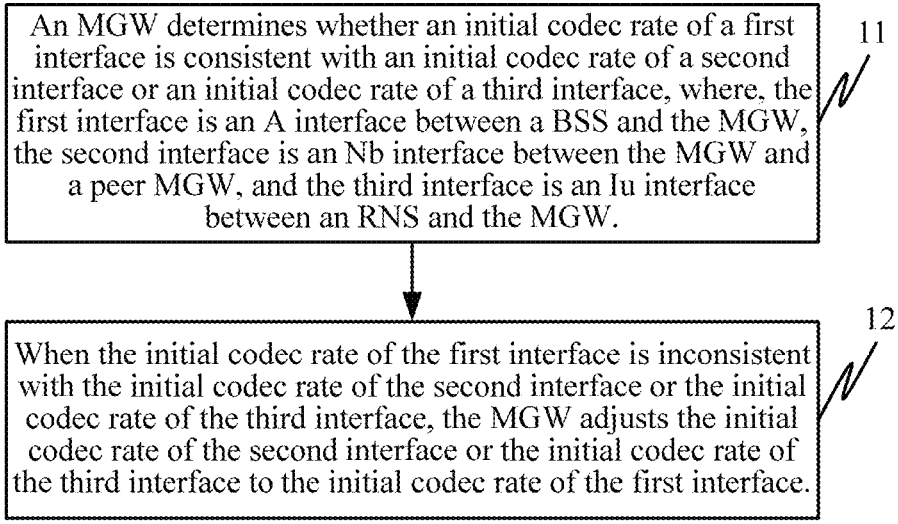
FIG. 1 is a schematic flowchart of a method for codec rate adjustment according to an embodiment of the present invention.

An embodiment of the present invention provides a method for codec rate adjustment, which, as shown in FIG. 1, includes:

11. An MGW determines whether an initial codec rate of a first interface is consistent with an initial codec rate of a second interface or an initial codec rate of a third interface, where the first interface is an A interface between a BSS and the MGW, the second interface is an Nb interface between the MGW and a peer MGW, and the third interface is an Iu interface between an RNS and the MGW.

12. When the initial codec rate of the first interface is inconsistent with the initial codec rate of the second interface or the initial codec rate of the third interface, the MGW adjusts the initial codec rate of the second interface or the initial codec rate of the third interface to the initial codec rate of the first interface.

In the technical solution provided by the present embodiment of the invention, when determining that the initial codec rate of the Iu interface or the Nb interface is inconsistent with the initial codec rate of the A interface, the MGW adjusts the initial codec rate of the Iu interface or the Nb interface to the initial codec rate of the A interface, therefore implementing quick and convenient codec rate adjustment, improving voice service quality, and avoiding non-timely codec rate adjustment resulting from a slow process of initiating a request for reducing a codec rate after poor voice service quality is detected.

Optionally, the method for codec rate adjustment according to the embodiment of the present invention may further include:

After the first interface of the MGW receives a packet, the MGW determines whether the initial codec rate of the first interface is consistent with the initial codec rate of the second interface or the initial codec rate of the third interface.

In the method for codec rate adjustment according to the embodiment of the present invention, the codec rate includes a codec rate based on AMR/AMR-WB.

The following uses FIG. 2 to FIG. 6 as an example to illustrate the method for codec rate adjustment according to the embodiment of the present invention. For the purpose of convenient description, the following conventions are made:

An A interface between a BSS and an MGW is a first interface.

An Nb interface between two MGWs is a second interface.

An Iu Interface between an RNS and an MGW is a third interface.

Figure 2:
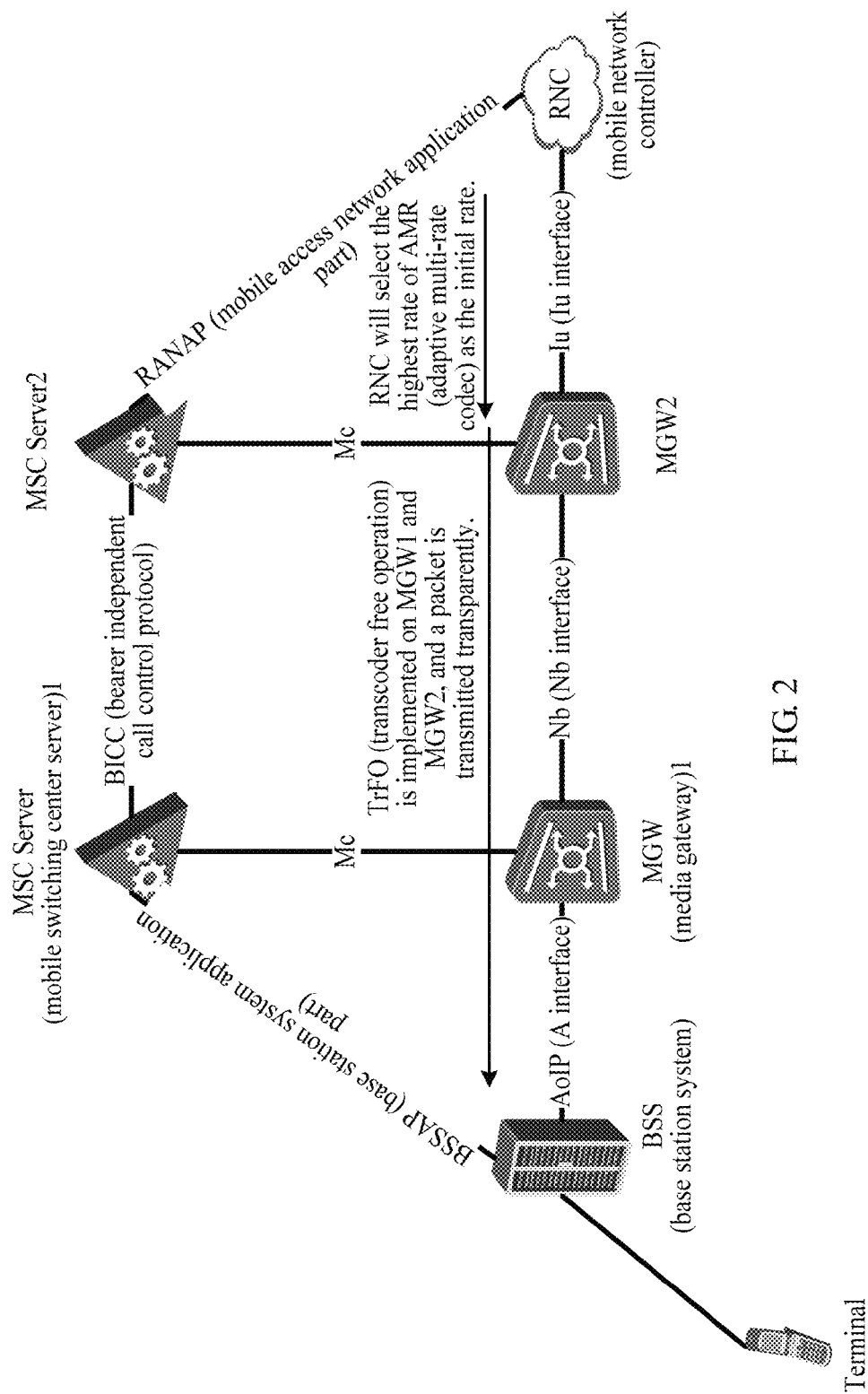
FIG. 2 is a first schematic diagram of an application scenario of a method for codec rate adjustment according to an embodiment of the present invention.

As shown in FIG. 2, in the application scenario in which communication between the 2nd generation mobile communication technology (2G) network and the 3rd generation mobile communication technology (3G) network is supported, the codec selected for the core network is AMR. A Radio Network Controller (RNC) selects the highest rate in the AMR as an initial codec rate. TrFO is implemented on an MGW1 and an MGW2.

A method for codec rate adjustment provided by an embodiment of the present invention includes:

The MGW1 determines that an initial rate of an A interface is inconsistent with an initial codec rate of an Nb interface.

The MGW1 sends a request for adjusting a rate to the Nb interface to adjust the initial codec rate of the Nb interface to the initial codec rate of the A interface.

In addition, on the MGW2, if the initial codec rate of the Nb interface is consistent with the initial codec rate of the Iu interface, the MGW2 does not initiate a rate adjustment operation.

Figure 3:
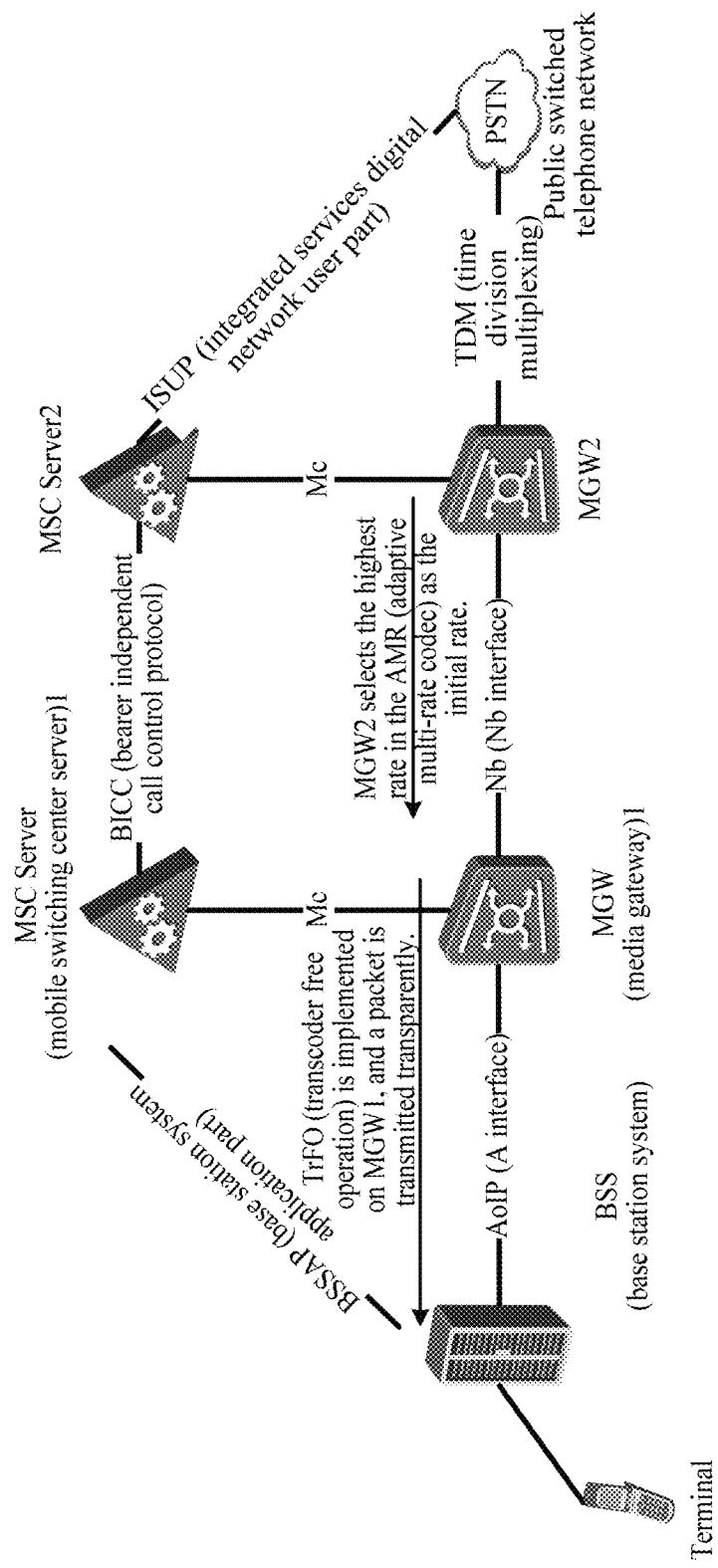
FIG. 3 is a second schematic diagram of an application scenario of a method for codec rate adjustment according to an embodiment of the present invention.

As shown in FIG. 3, in the application scenario in which communication between the 2G network and the Public Switched Telephone Network (PSTN) is supported, the codec selected for the core network is AMR. An MGW2 selects the highest rate in the AMR as an initial codec rate. TrFO is implemented on an MGW1.

A method for codec rate adjustment provided by an embodiment of the present embodiment includes:

The MGW1 determines that an initial rate of an A interface is inconsistent with an initial codec rate of an Nb interface.

The MGW1 sends a request for adjusting a rate to the Nb interface to adjust the initial codec rate of the Nb interface to the initial codec rate of the A interface.

In addition, the MGW2 does not initiate a rate adjustment operation because only the Nb interface exists on the MGW2.

Figure 4:
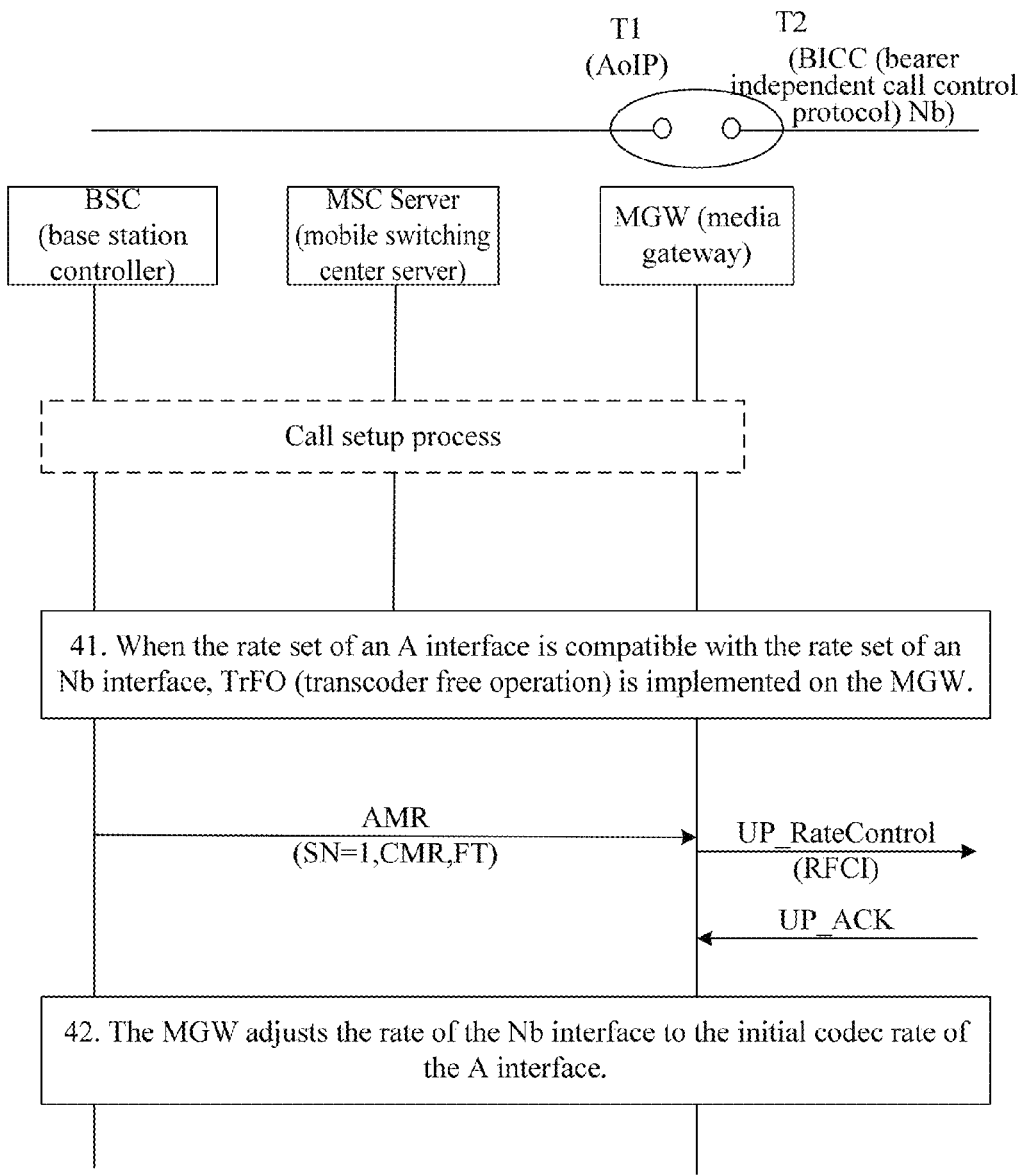
FIG. 4 is a first schematic flowchart of an application process of a method for codec rate adjustment according to an embodiment of the present invention.

As shown in FIG. 4 which is a schematic flowchart of an application, an MGW is used as an example to illustrate a method for codec rate adjustment provided in an embodiment of the present invention, including:

41. After a user initiates a call, the codec determined by negotiation between the call-incoming side of an Mobile Switching Center (MSC) Server and the call-outgoing side of a Bearer Independent Call Control (BICC) protocol is AMR; an MGW initiates an Nb UP initialization operation based on a rate set of an A interface to negotiate a rate set of an Nb interface and an initial codec rate of the Nb interface. When the rate set of the A interface is compatible with the rate set of the Nb interface, TrFO is implemented on the MGW.

42. After the MGW completes the communication and receives the first Real-Time Transport Protocol (RTP) packet from the base station controller (BSC), the MGW first determines whether the initial codec rates of the A interface and Nb interface are consistent. If they are inconsistent, the MGW needs to initiate a rate control negotiation on the Nb interface to adjust the initial codec rate of the Nb interface to the initial codec rate of the A interface. After the peer MGW returns a correct response, the initial codec rates of the A interface and Nb interface become consistent.

Figure 5:
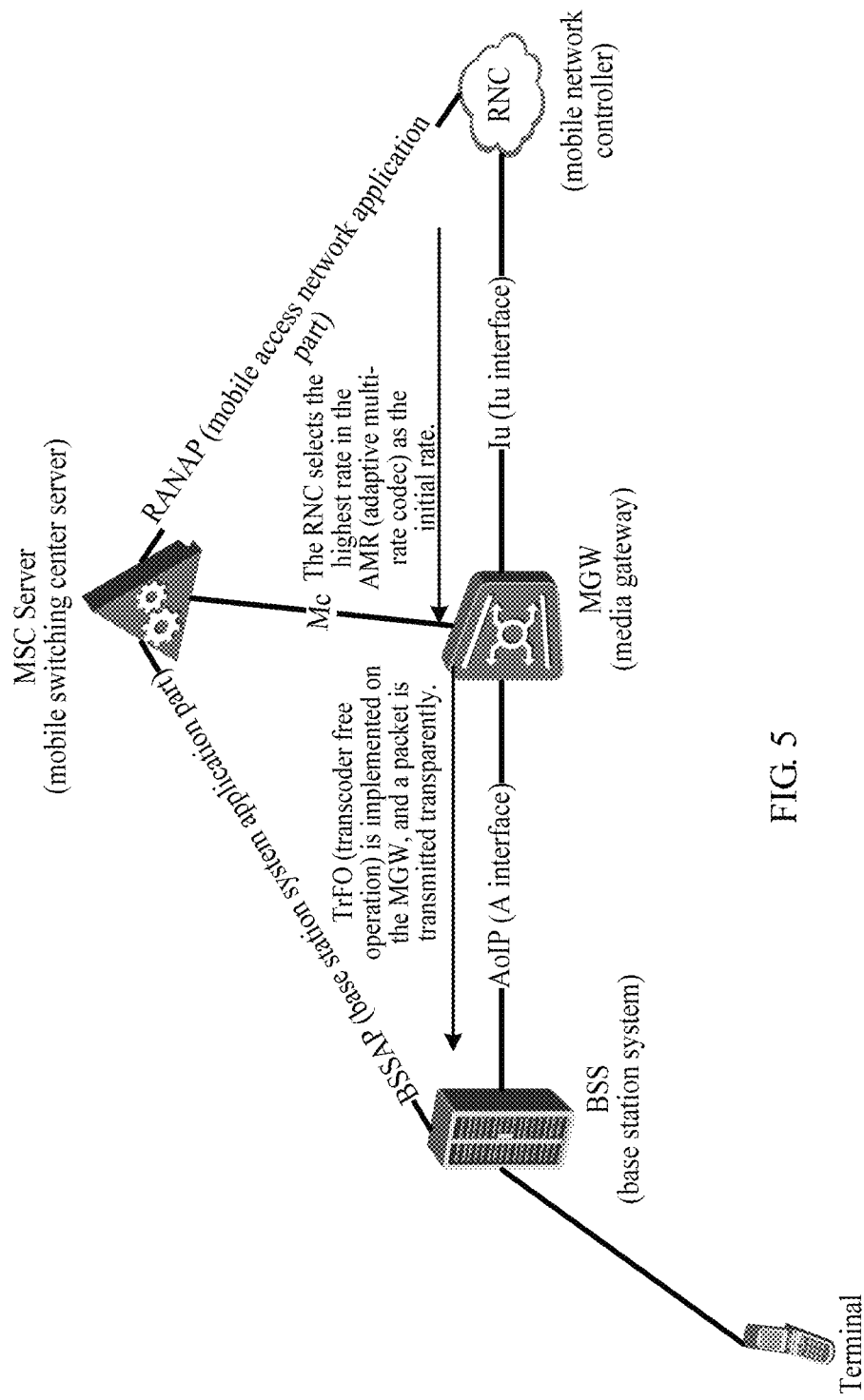
FIG. 5 is a third schematic diagram of an application scenario of a method for codec rate adjustment according to an embodiment of the present invention.

As shown in FIG. 5, in the scenario where communication between the 2G network and the 3G network is supported, the codec selected for the core network is AMR. An RNC selects the highest rate in the AMR as an initial codec rate. TrFO is implemented on an MGW.

A method for codec rate adjustment provided by an embodiment of the present embodiment includes:

The MGW determines that an initial codec rate of an A interface is inconsistent with an initial codec rate of an Iu interface.

The MGW sends a request for adjusting a rate to the Iu interface to adjust the initial codec rate of the Iu interface to the initial codec rate of the A interface.

Figure 6:
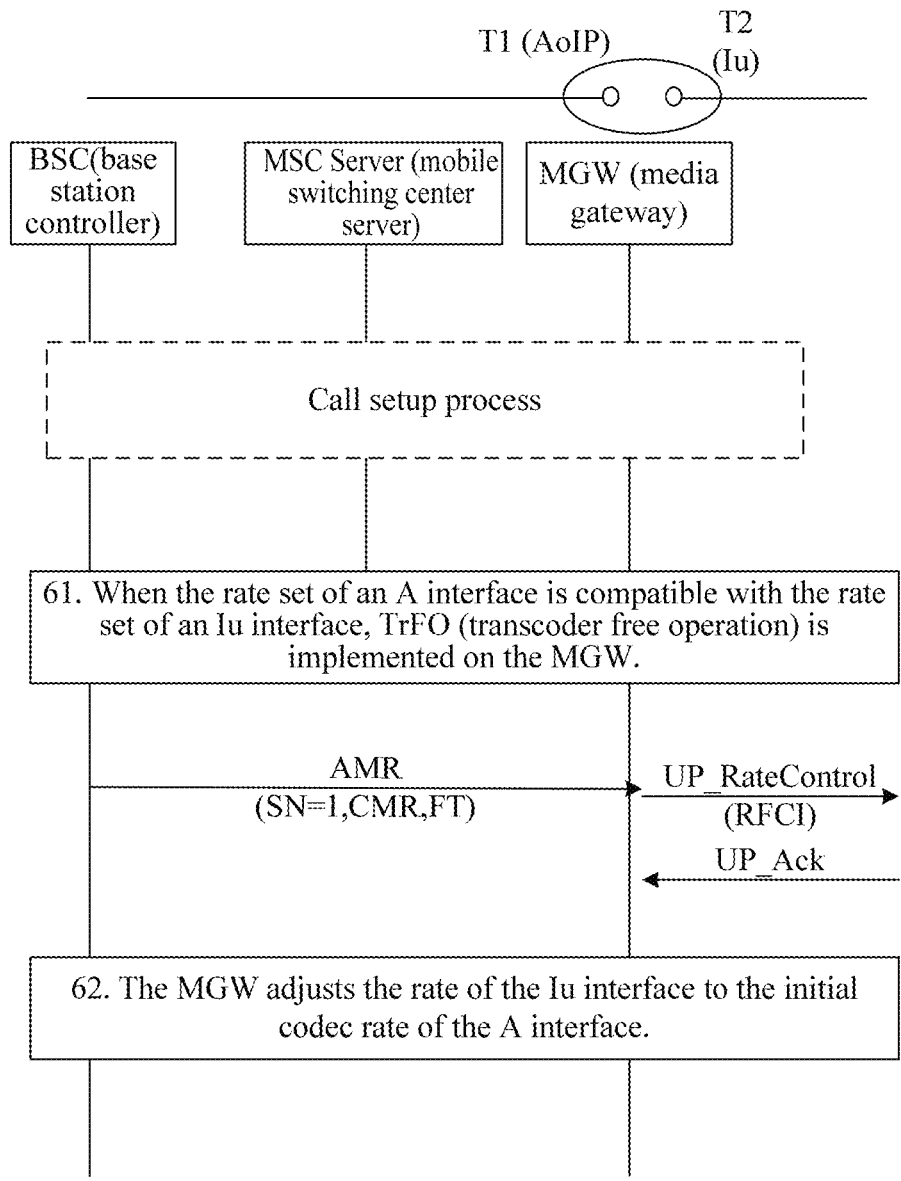
FIG. 6 is a second schematic flowchart of an application process of a method for codec rate adjustment according to an embodiment of the present invention.

As shown in FIG. 6 which is a schematic flowchart of an application, an MGW is used as an example to illustrate a method for codec rate adjustment provided in an embodiment of the present invention, including:

61. After a user initiates a call, the codec determined by negotiation between the call-incoming side of an MSC Server and the call-outgoing side of a BICC is AMR; the MGW initiates an Iu UP initialization operation based on a rate set of an A interface to negotiate a rate set of an Iu interface and an initial codec rate of the Iu interface. When the rate set of the A interface is compatible with the rate set of the Iu interface, TrFO is implemented on the MGW.

62. After the MGW receives the first RTP packet from a BSC, the MGW first determines whether the initial codec rates of the A interface and the initial codec rates of the Iu interface are consistent. If they are inconsistent, the MGW needs to initiate a rate control negotiation on the Iu interface to adjust the initial codec rate of the Iu interface to the initial codec rate of the A interface.

In the technical solution provided by the embodiment of the present invention, when determining that the initial codec rate of the Iu interface or the Nb interface is inconsistent with the initial codec rate of the A interface, the MGW adjusts the initial codec rate of the Iu interface or the Nb interface to the initial codec rate of the A interface, therefore implementing quick and convenient codec rate adjustment, improving voice service quality, and avoiding non-timely codec rate adjustment resulting from a slow process of initiating a request for reducing a codec rate after poor voice service quality is detected.

Figure 7:
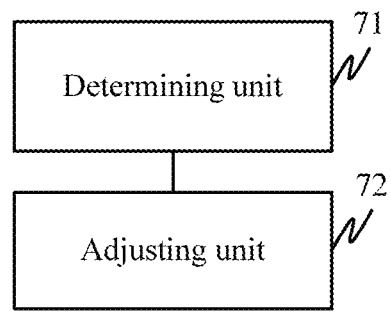
FIG. 7 is a first schematic structural diagram of an apparatus for codec rate adjustment according to an embodiment of the present invention.

As shown in FIG. 7, corresponding to the methods for codec rate adjustment according to the foregoing embodiments, an embodiment of the present invention provides an apparatus for codec rate adjustment, including: a determining unit 71 configured to determine whether an initial codec rate of a first interface is consistent with an initial codec rate of a second interface or an initial codec rate of a third interface, where the first interface is an A interface between a BSS and an MGW, the second interface is an Nb interface between the MGW and a peer MGW, and the third interface is an Iu interface between an RNS and the MGW; an adjusting unit 72 configured to adjust the initial codec rate of the second interface or the initial codec rate of the third interface to the initial codec rate of the first interface when the determining unit 71 determines that the initial codec rate of the first interface is inconsistent with the initial codec rate of the second interface or the initial codec rate of the third interface.

The apparatus for codec rate adjustment according to the embodiment of the present invention can be set separately or be integrated into the media gateway.

In the technical solution provided by the embodiment of the present invention, when determining that the initial codec rate of the Iu interface or the Nb interface is inconsistent with the initial codec rate of the A interface, the MGW adjusts the initial codec rate of the Iu interface or the Nb interface to the initial codec rate of the A interface, therefore implementing quick and convenient codec rate adjustment, improving voice service quality, and avoiding non-timely codec rate adjustment resulting from a slow process of initiating a request for reducing a codec rate after poor voice service quality is detected.

Figure 8:
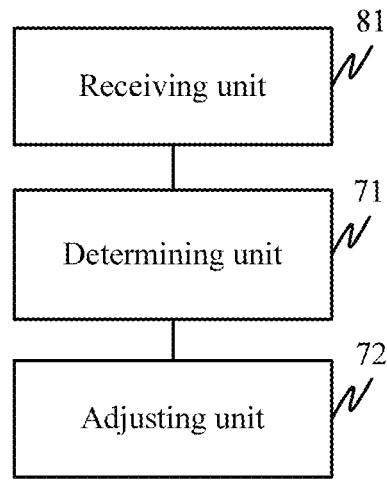
FIG. 8 is a second schematic structural diagram of an apparatus for codec rate adjustment according to an embodiment of the present invention.

As shown in FIG. 8, optionally, an apparatus for codec rate adjustment according to an embodiment of the present invention may further include: a receiving unit 81 configured to receive a packet through the first interface, where after the receiving unit 81 receives the packet, the determining unit 71 determines whether the initial codec rate of the first interface is consistent with the initial codec rate of the second interface or the initial codec rate of the third interface.

For the apparatus for codec rate adjustment according to the embodiments of the present invention, the codec rate includes a codec rate based on AMR/AMR-WB.

The apparatus for codec rate adjustment according to the embodiments of the present invention and the working principles of the apparatus can be understood by referring to the method for codec rate adjustment according to the foregoing embodiments, and the details are not described herein again.

An embodiment of the present invention provides a media gateway, including an apparatus for codec rate adjustment. The apparatus for codec rate adjustment is configured to determine whether an initial codec rate of a first interface is consistent with an initial codec rate of a second interface or an initial codec rate of a third interface, where the first interface is an A interface between a BSS and an MGW, the second interface is an Nb interface between the MGW and the peer MGW, and the third interface is an Iu interface between an RNS and the MGW. When determining that the initial codec rate of the first interface is inconsistent with the initial codec rate of the second interface or the initial codec rate of the third interface, the apparatus for codec rate adjustment adjusts the initial codec rate of the second interface or the initial codec rate of the third interface to the initial codec rate of the first interface.

In the technical solution provided by the foregoing embodiment of the present invention, when determining that the initial codec rate of the Iu interface or the Nb interface is inconsistent with the initial codec rate of the A interface, the MGW adjusts the initial codec rate of the Iu interface or the Nb interface to the initial codec rate of the A interface, therefore implementing quick and convenient codec rate adjustment, improving voice service quality, and avoiding non-timely codec rate adjustment resulting from a slow process of initiating a request for reducing a codec rate after poor voice service quality is detected.

The apparatus for codec rate adjustment in the media gateway according to the embodiment of the present invention can be understood by referring to the apparatus for codec rate adjustment according to the foregoing embodiments, and the details are not described herein again.

It should be understood that the system, the apparatus and the method provided by the embodiments of the present invention may be implemented in other manners. For example, the described apparatus embodiments are merely exemplary, where the unit division is merely logical function division and there may be other division in actual implementation. For example, a plurality of units or components may be combined or integrated into a system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical or other forms.

The units described as separate parts may or may not be physically separate, and parts displayed as units may or may not be physical units, may be located in one position, or may be distributed on a plurality of network units. A part or all of the units may be selected according to an actual need to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The computer software product is stored in a storage medium and includes several instructions for instructing a computer device (which may be a personal computer, a server, a network device, and the like) to perform all or a part of the steps of the methods described in the embodiments of the present invention. The storage medium includes any medium that can store program code, such as a universal serial bus (USB) flash drive, a removable hard disk, a readonly memory (ROM), a random access memory (RAM), a magnetic disk, or an optical disc.

The foregoing descriptions are merely specific embodiments of the present invention, but are not intended to limit the protection scope of the present invention. Any variation or replacement readily figured out by persons skilled in the art within the technical scope disclosed in the present invention shall fall within the protection scope of the present invention. Therefore, the protection scope of the present invention shall be subject to the appended claims.

What is claimed is:

1. A method for codec rate adjustment, comprising:
   determining, by a media gateway (MGW), whether an initial codec rate of a first interface is consistent with an initial codec rate of a second interface when the MGW comprises the first interface and the second interface, wherein the first interface is an A interface between a base station subsystem (BSS) and the MGW, and wherein the second interface is a Nb interface between the MGW and a peer MGW;
   determining, by the MGW, whether the initial codec rate of the first interface is consistent with an initial codec rate of a third interface when the MGW comprises the first interface and the second interface, wherein the third interface is an Iu interface between a radio network subsystem (RNS) and the MGW;
   adjusting, by the MGW, the initial codec rate of the second interface to the initial codec rate of the first interface, without adjusting the initial codec rate of the first interface, when the MGW comprises the first interface and the second interface and the initial codec rate of the first interface is inconsistent with the initial codec rate of the second interface; and
   adjusting by the MGW, the initial codec rate of the third interface to the initial codec rate of the first interface, without adjusting the initial codec rate of the first interface, when the MGW comprises the first interface and the third interface and the initial codec rate of the first interface is inconsistent with the initial code rate of the third interface.

2. The method for codec rate adjustment according to claim 1, further comprising receiving, by the MGW, a packet through the first interface prior to determining whether the initial codec rate of the first interface is consistent with either the initial codec rate of the second interface or the initial codec rate of the third interface.

3. The method for codec rate adjustment according to claim 1, wherein the initial codec rate of the first interface, the initial codec rate of the second interface, or the initial codec rate of the third interface comprises a codec rate based on either adaptive multi-rate codec (AMR) or adaptive multi-rate wideband codec (AMR-WB).

4. The method for codec rate adjustment according to claim 1, wherein before determining whether the initial codec rate of the first interface is consistent with the initial codec rate of the second interface, the method further comprising initiating, by the MGW, an Nb UP initialization operation based on a rate set of the first interface to negotiate a rate set of the second interface and the initial codec rate of the second interface.

5. The method for codec rate adjustment according to claim 4, wherein when the rate set of the first interface is compatible with the rate set of the second interface, transcoder free operation (TrFO) is implemented on the MGW.

6. The method for codec rate adjustment according to claim 1, wherein before determining whether the initial codec rate of the first interface is consistent with the initial codec rate of the third interface, the method further comprising initiating, by the MGW, an Iu UP initialization operation based on a rate set of the first interface to negotiate a rate set of the third interface and the initial codec rate of the third interface.

7. The method for codec rate adjustment according to claim 6, wherein when the rate set of the first interface is compatible with the rate set of the third interface, TrFO is implemented on the MGW.

8. An apparatus for codec rate adjustment, comprising:
   a determining unit configured to:
      determine whether an initial codec rate of a first interface is consistent with an initial codec rate of a second interface when the apparatus comprises the first interface and the second interface, wherein the first interface is an A interface between a base station subsystem (BSS) and a media gateway (MGW), and wherein the second interface is an Nb interface between the MGW and a peer MGW; and
      determine whether the initial codec rate of the first interface is consistent with an initial codec rate of a third interface when the apparatus comprises the first interface and the second interface, wherein the third interface is an IU interface between a radio network subsystem (RNS) and the MGW; and
   an adjusting unit configured to:
      adjust the initial codec rate of the second interface to the initial codec rate of the first interface, without adjusting the initial codec rate of the first interface, when the apparatus comprises the first interface and the second interface and the determining unit determines that the initial codec rate of the first interface is inconsistent with the initial codec rate of the second interface; and
      adjust the initial codec rate of the third interface to the initial codec rate of the first interface, without adjusting the initial codec rate of the first interface, when the apparatus comprises the first interface and the third interface and the determining unit determines that the initial codec rate of the first interface is inconsistent with the initial codec rate of the second interface.

9. The apparatus for codec rate adjustment according to claim 8, further comprising a receiving unit configured to receive a packet through the first interface, wherein after the receiving unit receives the packet, the determining unit determines whether the initial codec rate of the first interface is consistent with either the initial codec rate of the second interface or the initial codec rate of the third interface.

10. The apparatus for codec rate adjustment according to claim 8, wherein the initial codec rate of the first interface, the initial codec rate of the second interface, or the initial codec rate of the third interface comprises a codec rate based on adaptive multi-rate codec (AMR) or adaptive multi-rate wideband codec (AMR-WB).

11. The apparatus for codec rate adjustment according to claim 8, further comprising
   an initiating unit configured to initiate either:
      an Nb UP initialization operation based on a rate set of the first interface to negotiate a rate set of the second interface and the initial codec rate of the second interface before determining whether the initial codec rate of the first interface is consistent with the initial codec rate of the second interface; or
      an Iu UP initialization operation based on a rate set of the first interface to negotiate a rate set of the third interface and the initial codec rate of the third interface before the determining whether the initial codec rate of the first interface is consistent with the initial codec rate of the third interface.

12. A media gateway (MGW), comprising:
a processor; and
a memory coupled to the processor, wherein the processor is configured to:
   determine whether an initial codec rate of a first interface is consistent with an initial codec rate of a second interface when the MGW further comprises the first interface and the second interface, wherein the first interface is an A interface between a base station subsystem (BSS) and the MGW, and wherein the second interface is an Nb interface between the MGW and a peer MGW;
   determine whether the initial codec rate of the first interface is consistent with an initial codec rate of a third interface when the MGW further comprises the first interface and the third interface, wherein the third interface is an IU interface between a radio network subsystem (RNS) and the MGW;
   adjust the initial codec rate of the second interface to the initial codec rate of the first interface, without adjusting the initial codec rate of the first interface, when the MGW further comprises the first interface and the second interface and the initial codec rate of the first interface is inconsistent with the initial codec rate of the second interface; and
   adjust the initial codec rate of the third interface to the initial codec rate of the first interface, without adjusting the initial codec rate of the first interface, when the MGW further comprises the first interface and the third interface and the initial codec rate of the first interface is inconsistent with the initial codec rate of the third interface.

13. The MGW according to claim 12, wherein the processor is further configured to receive a packet through the first interface before determining whether the initial codec rate of the first interface is consistent with either the initial codec rate of the second interface or the initial codec rate of the third interface.

14. The MGW according to claim 12, wherein the initial codec rate of the first interface, the initial codec rate of the second interface, or the initial codec rate of the third interface comprises a codec rate based on adaptive multi-rate codec (AMR) or adaptive multi-rate wideband codec (AMR-WB).

15. The MGW according to claim 12, wherein the processor is further configured to initiate an Nb UP initialization operation based on a rate set of the first interface to negotiate a rate set of the second interface and the initial codec rate of the second interface before determining whether the initial codec rate of the first interface is consistent with the initial codec rate of the second interface.

16. The MGW according to claim 15, wherein when the rate set of the first interface is compatible with the rate set of the second interface, transcoder free operation (TrFO) is implemented on the MGW.

17. The MGW according to claim 12, wherein the processor is further configured to initiate an Iu UP initialization operation based on a rate set of the first interface to negotiate a rate set of the third interface and the initial codec rate of the third interface before the determining whether the initial codec rate of the first interface is consistent with the initial codec rate of the third interface.

18. The MGW according to claim 17, wherein when the rate set of the first interface is compatible with the rate set of the third interface, TrFO is implemented on the MGW.

* * * * *